(12) United States Patent
Grimm et al.

(10) Patent No.: US 7,259,209 B2
(45) Date of Patent: Aug. 21, 2007

(54) REACTIVE HOT-MELT-TYPE ADHESIVE GRANULES FOR FABRICATING INSULATING GLASS

(75) Inventors: Stefan Grimm, Schwetzingen (DE); Manfred Proebster, Nussloch (DE); Matthias Kohl, Laudenbach (DE); Andreas Ferencz, Duesseldorf (DE)

(73) Assignee: H.B.Fuller Licensing & Financing, Inc., St. Paul, MN (US)

( * ) Notice: Subject to any disclaimer, the term of this patent is extended or adjusted under 35 U.S.C. 154(b) by 348 days.

(21) Appl. No.: 10/240,144

(22) PCT Filed: Mar. 20, 2001

(86) PCT No.: PCT/EP01/03164

§ 371 (c)(1),
(2), (4) Date: Feb. 25, 2003

(87) PCT Pub. No.: WO01/72922

PCT Pub. Date: Oct. 4, 2001

(65) Prior Publication Data

US 2003/0162882 A1  Aug. 28, 2003

(30) Foreign Application Priority Data

Mar. 28, 2000 (DE) ................ 100 15 290

(51) Int. Cl.
*C08L 43/00* (2006.01)
*C08L 9/00* (2006.01)
*C08L 47/00* (2006.01)
*C08L 23/04* (2006.01)
*C08L 23/10* (2006.01)
*C08L 25/02* (2006.01)

(52) U.S. Cl. ................ 525/191; 525/88; 525/209; 525/232; 525/233; 525/236; 525/237; 525/240

(58) Field of Classification Search ............ 525/191, 525/209, 232, 233, 234, 236, 237, 240, 88, 525/241

See application file for complete search history.

(56) References Cited

U.S. PATENT DOCUMENTS 4,085,238 A  4/1978  Chenel et al.
4,226,063 A  10/1980 Chenel
4,696,256 A  9/1987  Lenhardt
4,844,959 A * 7/1989  Read et al. ............. 428/34.9
4,986,443 A  1/1991  Saur et al.
5,533,314 A  7/1996  Kunert
5,558,116 A  9/1996  Dunbach
5,604,033 A  2/1997  Arthurs et al.
5,698,656 A * 12/1997 Ohashi et al. ............. 528/49
6,878,776 B1 * 4/2005  Pascault et al. ........... 525/113
2004/0059069 A1 * 3/2004  Grimm et al. ............ 525/474

FOREIGN PATENT DOCUMENTS

| | | |
|---|---|---|
| CA | 1 304 352 | 6/1992 |
| CA | 2 258 585 | 12/1997 |
| DE | 23 55 384 | 6/1976 |
| DE | 25 55 383 | 6/1976 |
| DE | 25 55 381 | 9/1976 |
| DE | 87 17 424 | 12/1988 |
| DE | 198 21 356 | 11/1999 |
| EP | 0 081 656 | 2/1991 |
| EP | 0 313 519 | 7/1991 |
| EP | 0 176 388 | 12/1991 |
| EP | 0 351 358 | 3/1992 |
| EP | 0 312 967 | 4/1993 |
| EP | 0491561 B1 | 11/1995 |
| EP | 0 758 029 | 2/1997 |
| EP | 0 714 964 | 7/1998 |
| GB | 1 524 848 | 12/1975 |
| JP | 10 204222 | 4/1998 |
| WO | WO94/16187 | 7/1994 |
| WO | WO95/24556 | 9/1995 |
| WO | WO97/15619 | 5/1997 |
| WO | WO97/31769 | 9/1997 |
| WO | WO97/48778 | 12/1997 |

OTHER PUBLICATIONS

Standard Atmospheres, Climates and their technical application, (DIN 50 014), Beuth Verlag GmbH, pp. 1-2 (Jul. 1985).

* cited by examiner

*Primary Examiner*—Nathan M. Nutter

(57) ABSTRACT

A mixture of at least two thermoplastic particles having reactive grups which when melted and mixed react to form a high molecular weight polymer. The blend of particles when molten is particularly useful in forming double insulating glass or plastic panels.

19 Claims, No Drawings

REACTIVE HOT-MELT-TYPE ADHESIVE GRANULES FOR FABRICATING INSULATING GLASS

RELATED APPLICATIONS

This application is a 35 U.S.C. 371(c) application of PCT/EP01/03164 filed Mar. 21, 2002, claiming priority from German Application Serial Number 100 15 290.2, filed Mar. 28, 2000, the entire contents of each application is incorporated herein by reference.

FIELD OF THE INVENTION

This invention relates to a reactive blend of thermoplastic polymer particles and to a process for the production of two-panel or multi-panel insulating glass.

BACKGROUND OF THE INVENTION

Two-panel or multi-panel insulating glass composite systems consist of two or more glass panels which are arranged parallel to one another and which are joined at their edges in such a way that the gap between the panels is sealed off from the ambient air so that it cannot be penetrated by moisture. In addition, the edge seal is designed in such a way that it is able to withstand all the mechanical and chemical stresses caused by varying climatic conditions. In many cases, the gap between the panels is filled with dry gases which increase heat or sound insulation in relation to the normal air filling. Insulating glass of the type in question is mainly used in the building industry, but also in vehicle manufacture.

The edge seal of such insulating glass can be formed in different ways. In what is still the most common version, a hollow aluminium or steel profile acts as a spacer for the required gap between the glass panels. It is arranged near the edges of the glass panels so that the spacer together with the edges of the glass panels forms an outwardly facing channel for accommodating sealants and adhesives. These sealants and adhesives provide the insulating glass assembly with sufficient strength. In high-quality insulating glass systems designed to meet modern standards, a sealant acting as a barrier against water vapor is arranged between those surfaces of the spacer which face the glass panels and the surface of the glass. Thermoplastic formulations based on polyisobutylene and/or butyl rubber are generally used for this purpose. The production of such insulating glass assemblies generally involves a number of complex steps and is still very expensive despite the high degree of automation found in large production lines. Accordingly, numerous attempts have been made to simplify the complex steps involved in the production of insulating glass and, in particular, to eliminate the need for pre-profiled spacers.

In the so-called Biver system, for example, a thermoplastic strand, which is preferably based on polyisobutylene or butyl rubber and which may contain a molecular sieve to absorb moisture, is first extruded onto one panel around its edges. The second panel is then positioned over the first, after which the two panels are pressed together to the predetermined distance. The outer edge region is then sealed by a generally two-component adhesive/sealant. This system is described in numerous patents/applications, for example in DE-C-2555381, DE-A-2555383, DE-A-2555384 and in EP-A-176388 or EP-A-714964.

In order to facilitate flexible coupling of the panels and to obtain a dimensionally stable, self-supporting assembly, WO 94/16187 proposes the use of shaped bodies of a textile as the spacer between the glass panels. The textile spacer contains highly elastic but rigid link filaments and is impregnated with a resin as binder to form the edge seal. To this end, the edge of one panel is covered with the resin-impregnated textile spacer. The second panel is then placed exactly over the first, after which the two panels are pressed together to join them at their edges. After the press has been opened, the reactive binder system is left to cure.

WO 97/31769 describes a preformed flexible laminate for forming the edge seal between insulating glass panels. This flexible laminate contains a wavy flat material partly or completely embedded in its core material as spacer, its surface extending perpendicularly of the glass panels. On at least one surface, the laminate has a polymeric coating which seals off the interior of the panel assembly against air and/or moisture and maintains the required distance between the glass panels. Laminates of the type in question are produced by a multi-step co-extrusion process in which the wavy flat material is first embedded in a core material which then has to be coated with one or more polymeric materials on its outer surfaces.

According to EP-A-81656, two-panel insulating glass is produced by first coating the edges of the glass panels to be joined with a solution of a primer or adhesive. The glass panels are then brought to the predetermined distance apart and a thermoplastic resin composition of a butyl rubber and a crystalline polyolefin, which may also contain tackifiers and drying agents, is extruded into the edge region.

The disadvantage of all the above-mentioned edge sealing systems based on thermoplastic polymers lies in their poor heat resistance and long-term temperature resistance. These disadvantages can only be overcome by using reactive systems of the reactive hotmelt adhesive type which post-crosslink either thermally or under the effect of moisture or oxygen so that a crosslinked polymer matrix around the edge of the insulating glass system provides for adequate thermal stability. Thus, WO 97/15619 describes sealants/adhesives for the production of insulating glass units based on one-component, hot-applied, chemically crosslinking adhesives/sealants. These binder systems contain a thermoplastic hotmelt adhesive resin mixed with a resin which can be crosslinked with atmospheric oxygen and/or moisture. The hotmelt adhesive resin acts as a fusible component during the original application and establishes early strength immediately after cooling. The crosslinkable polymer phase then begins to react by crosslinking with the oxygen or moisture in the surrounding air. The crosslinkable resins mentioned include moisture-reactive polyurethanes, moisture-reactive polysulfides, polydimethyl siloxanes or oxygen-curing polysulfides.

DE-A-19821356 describes a process for the production of a silane-modified butyl rubber in which a butyl rubber is reacted with a mercaptofunctional silane containing hydroxy groups or hydrolyzable groups in the presence of a radical former. According to the teaching of this document, such polymers can be mixed with other additives in a kneader, processed to form a two-component composition and applied to glass by means of a suitable machine. The applied composition then acts simultaneously as a spacer for the two glass panels, contains a drying agent for the inter-panel gap and acts as a water vapor and gas barrier and as an elastic bond.

WO 97/48778 describes a hotmelt adhesive composition containing a mixture of at least one reactive binder based on silane-functional polyisobutylenes, hydrogenated polybutadiene and/or poly-α-olefins and a non-reactive binder from the group of butyl rubbers, poly-α-olefins, polybutenes, styrene block copolymers or diene polymers. These hotmelt adhesive compositions may be used as one- or two-component adhesives/sealants for the production of insulating glass. There is no need for separate spacers of metal or plastic profiles.

Besides some processing-related advantages, the various systems described in the foregoing have certain disadvantages. The Biver system requires a thermoplastic spacer (TPS) and a conventional, generally two-component adhesive based on polysulfide, silicone or polyurethane. Although, in the case of reactive hotmelt adhesives, only one material is generally required, both the above-mentioned binder systems are supplied in drums from which the material is pumped to the point of application, optionally after heating. Problems can arise during processing if, in cases where the volume of material called up per unit of time is high, the quantity melted in the reservoir of the applicator and the melting rate per unit of time are not sufficient to guarantee the necessary flow of material. In addition, the reactive one-component warm- or hot-melting systems are attended by the problems familiar to the expert, such as difficulties during packaging, poor stability in storage and a low curing rate and during the disposal/cleaning of the used adhesive-contaminated containers.

Against the background of this prior art, the problem addressed by the present invention was to provide a binder system which would lend itself to application in the same way as reactive hotmelt adhesives, but which would provide for improved storage, feeding and transportation in relation to the prior art. In particular, the binder system would be easy to handle and to dose, even after prolonged storage at various temperatures. This would also include avoiding contamination of the transit containers. In addition, the reactive components would lend themselves to rapid melting and mixing. Neither the adhesive properties nor the water vapor and gas barrier effect would be adversely affected.

BRIEF DESCRIPTION OF THE INVENTION

The solution to the problem stated above is defined in the claims and consists essentially in the provision of a reactive blend of thermoplastic polymer particles based on poly-α-olefins, elastomeric block copolymers and/or polyisobutylenes, a) a proportion of the blend particles containing polymers with reactive groups selected from hydroxyl groups, amino groups, carboxyl groups, carboxylic anhydride groups, mercapto groups, silane groups and/or hydrosilyl groups and b) another proportion of the blend particles containing polymers with reactive groups selected from isocyanate groups, epoxide groups, active olefinically unsaturated double bonds and/or water-containing or forming substances and c) optionally a further proportion of the blend particles containing auxiliaries and additives which do not react with the functional groups of the a) and b) particles.

DETAILED DESCRIPTION OF THE INVENTION

The elastomeric block copolymers according to the invention include in particular the di- and tri-block copolymers of styrene with butadiene or isoprene and hydrogenation products thereof, for example styrene/butadiene/styrene (SBS), styrene/isoprene/styrene (SIS), styrene/ethylene/butylene/styrene (EBS) and styrene/ethylene/propylene/styrene (SEPS).

The present invention also relates to a process for joining flat materials, more particularly insulating glass panels, which essentially comprises the following steps:

a) homogenizing and melting the above-mentioned reactive blend, optionally in an inert atmosphere with no moisture and/or oxygen, using a high-shear, optionally heatable mixing unit, b) extruding the homogenized reactive thermoplastic mixture, optionally through a shaping nozzle, onto at least one edge of a flat material, c) subsequently fitting a second matching flat material onto the applied layer of the reactive mixture, d) optionally mechanically fixing and/or pressing the fitted flat material, e) cooling the composite system of flat materials thus formed to room temperature, the reactive mixture curing by crosslinking.

The present invention also relates to the production of two-panel or multi-panel insulating glass, sheet-form casting resins, solar collectors or facade elements for buildings by the process described above.

Blend particles in the context of the present invention are understood to be polymer-containing mixtures which largely retain their shape at room temperature. Room temperature in the present context is a typical storage temperature between 0° C. and about 30° C. The particles are granules with mean diameters between 0.5 and 40 mm, preferably between 1 and 30 mm and more particularly between 2 and 20 mm. In principle, the particles may have any shape, their shape largely being determined by the process used for their production. In one particularly preferred embodiment, the granules are produced by extrusion through a multiple-bore die and the strands thus extruded are cut to the required length. The granules may be both spherical and disk-like, cube-like, elliptical or cylindrical in shape.

Besides the reactive components a) and b), the granules also contain polyisobutylene, poly-α-olefins, elastomeric block copolymers, waxes and fillers, pigments, optionally water-binding agents in the form of molecular sieves (drying agents). The granules and particularly component c) may also contain auxiliaries and additives, such as catalysts, flow aids, antiagers and also drying agents, dyes and pigments.

By virtue of the presence of poly-α-olefins and particularly polyisobutylene and partly by virtue of the presence of the reactive constituents, the granules have a tacky surface immediately they leave the extruder or granulator so that they would agglomerate in the event of prolonged storage. In general, therefore, the granules are surface-coated with a suitable release agent immediately after granulation. The release agent may consist, for example, of a mixture of talcum, pyrogenic silica and molecular sieve powder. However, other powder-form release agents may also be used for surface-coating, including for example carbon black, highly disperse silicas without the other constituents mentioned above, polyethylene powder, ethylene/vinyl acetate powder or other fine-particle polymer powders. Release agents capable of being melted at slightly elevated temperatures, such as waxes for example, may also be sprayed onto the surface of the granules. Examples of such waxes are polyolefin waxes, particularly polyethylene wax, and even Fischer-Tropsch wax. The key selection criterion is that the particle surface should not be tacky at room temperature and storage temperature. However, the layer of release agent should lend itself to incorporation in the binder system without any incompatibility during further processing by the end user. This outer non-tacky layer should surround the core of the granule so completely that the surface layer can be said to be continuous, i.e. generally more than 90% and in particular more than 99% of the granule surface is coated. The granules thus flow freely. In other words, the granules flow freely through an opening under their own weight, even after prolonged storage at temperatures of up to 30 or 40° C., and can therefore be transported without difficulty.

Typically, the non-reactive constituents of the blend particles are present in the following quantities:
poly-α-olefins and/or elastomeric block copolymers: 5 to 30% by weight,
polyisobutylene: 20 to 50% by weight,
wax: 0 to 10% by weight, preferably 0.5 to 5% by weight
fillers: 10 to 30% by weight,
carbon black: 5 to 30% by weight, preferably 5 to 20% by weight,
molecular sieve: 10 to 20% by weight,
optionally catalysts, flow aids, antiagers: 0.5 to 8% by weight,
reactive polymer: 2 to 30% by weight, preferably 5 to 20% by weight.

Accordingly, the non-reactive binders are essentially formed from the group of poly-α-olefins, rubbers based on styrene block copolymers with dienes such as, for example butadiene or isoprene, these block copolymers optionally being completely or partly hydrogenated. Rubbers based on statistical diene homo- and/or copolymers may also be used. Another key constituent are butyl rubbers in the form of polybutenes or polyisobutylenes. Examples of poly-α-olefins are ethylene/propylene elastomers, such as ethylene/propylene copolymers for example, and terpolymers of ethylene and propylene with an unconjugated diene (EPDM) or propene/butene copolymers and ethylene/vinyl acetate.

The rubbers based on styrene block copolymers are mainly di- and tri-block copolymers of styrene with a diene such as, for example, butadiene or isoprene which are commercially available, for example, from Shell under the name of "Kraton". As already mentioned, these block copolymers may also be used in their hydrogenated or partly hydrogenated form.

Examples of the statistical diene homo- and copolymers are polybutadiene, polyisoprene, copolymers thereof and statistical styrene/butadiene copolymers (SBR), acrylonitrile/butadiene copolymers (NBR) and the partly hydrogenated or completely hydrogenated diene polymers of the last-mentioned group.

By virtue of their well-known and particularly good water vapor or gas barrier effect, the polybutenes and/or polyisobutene, i.e. the polyolefins produced by stereospecific polymerization of 1-butene or isobutene, and the butyl rubbers, i.e. copolymers of isobutylene with isoprene, are a particularly preferred key constituent of the granules.

The reactive thermoplastic polymer granules according to the invention additionally contain constituents known per se, including in particular water-binding fillers, preferably zeolites of the 3A type known as molecular sieves or powder-form calcium oxide. Fine-particle inert fillers, for example ground or precipitated chalks, kaolins, clays and carbon blacks, may also be used. The chalks, kaolins or clays may be used both in their surface-hydrophobicized form and without any surface pretreatment.

In addition, at least some of the thermoplastic polymer granules may contain organofunctional silanes as coupling agents and/or crosslinking agents, including for example 3-glycidyloxypropyl trialkoxysilane, 3-acryloxypropyl trialkoxysilane, 3-aminopropyl trialkoxysilane, vinyl trialkoxy silane, N-aminoethyl-3-aminopropyl dialkoxysilane, vinyl aminopropyl trialkoxysilane or aminoalkyl trialkoxysilane. Particularly preferred alkoxy groups are methoxy and ethoxy groups.

The choice of the antiager optionally used is determined by the composition of the binder. Antioxidants of the sterically hindered phenol, thioether or high molecular weight mercapto compound type, UV filters of the known benzotriazole, benzophenone or HALS (hindered amine light stabilizer) type may be used as antiagers. It can be useful to add known antiozonants and, in exceptional cases, hydrolysis stabilizers may also have to be added.

The reactive constituents of the thermoplastic granules are polymers or oligomers containing reactive groups. The polymers of groups a) and b) may be selected from polymers containing on average more than one functional group, preferably 2 to 2.5 groups. These reactive groups for the polymers of group a) may be selected from hydroxyl groups, amino groups, carboxyl groups, carboxylic anhydride groups, mercapto groups, silane groups and/or hydrosilyl groups.

The reactive groups of the group b) polymers should of course be complementary to the group a) polymers so that a two-component reactive system is latently present here. The reactive groups of the group b) polymers may be selected from isocyanate groups, epoxide groups, active olefinically unsaturated double bonds and/or water-binding substances or substances which contain adsorbed water and are capable of releasing it.

Actual examples of the group a) polymers are polybutadienes and polyisoprenes containing predominantly terminal OH groups, amino groups, carboxyl groups, carboxylic anhydride groups or mercapto groups which may optionally be completely partly hydrogenated. Polybutadienes containing alkoxysilane groups may also be used. The silane-functional polyisobutylenes, silane-functional hydrogenated polybutadienes and/or silane-functional poly-α-olefins described on pages 5 to 6 of WO 97/48778 may also be used.

The reactive polymer and/or oligomer used for component b) may be an isocyanate-terminated polybutadiene obtainable, for example, by the reaction of OH-functional polybutadiene with a diisocyanate such as, for example, diphenylmethane diisocyanate (MDI), toluene diisocyanate (TDI) or similar di- and polyisocyanates well-known from polyurethane chemistry. In the most simple case, component b) may even be the homolog mixture of multinuclear MDI homologs of the so-called "crude MDI" type. A component b) containing isocyanate groups is of course preferably combined with a hydroxyfunctional or aminofunctional or even mercaptofunctional component a).

In the most simple case, the epoxyfunctional component b) is selected from glycidyl ethers of polyphenols, i.e. glycidyl ethers of bisphenol A or the novolaks. However, relatively high molecular weight epoxy resins obtainable by reaction of diglycidyl ethers of bisphenol A with, for example, isocyanate prepolymers may also be used. An epoxyfunctional component b) is preferably combined with an aminofunctional, carboxyfunctional, carboxylic anhydride-functional or mercaptofunctional component a). If component b) contains active olefinically unsaturated double bonds as reactive groups in the polymer, it should be combined with a polymer component a) containing hydrosilyl groups. Another possibility is to combine highly reactive acrylate or methacrylate polymers of group b) with mercaptofunctional polymers of group a) (so-called "thiol-ene" reaction). However, the (meth)acrylate polymers of group b)

may also be combined with aminofunctional polymer particles a) which then enter into a Michael addition reaction during crosslinking.

The catalysts to be used in the thermoplastic reactive granules are determined by the reactive system selected and are known in principle to the expert. Examples of suitable catalysts are polyurethane catalysts from the group of organometallic compounds of tin, iron, titanium, bismuth, aliphatic tertiary amines and, in particular, cyclic aliphatic amines. Examples of epoxy catalysts are tertiary amines, Lewis acids or salts thereof or complex compounds thereof with organic amines. Catalytically active tertiary alkylamines such as, for example, tris-(dimethylamino)-phenol, piperidine, piperidine derivatives or imidazole derivatives may also be used as catalyst for the epoxides. Suitable crosslinking catalysts for silane-functional polymers are the organometallic compounds, tertiary amines or acids also used in polyurethane chemistry. The catalysts may be added either to the non-reactive component c) or to one of components a) or b). For example, the polyurethane catalysts may be added to component a) which contains hydroxyfunctional, aminofunctional or mercaptofunctional polymers.

The individual components a), b) and/or c) are first prepared by homogenizing the mixture components in a kneader, internal mixer or similar mixing unit, extruding the resulting mixture through a suitable extrusion die—for example a multiple bore die—and then size-reducing the extruded strands into granules. After the granules have been surface-coated with the above-mentioned release agents, the individual components a), b) and c) are packed in the necessary quantity ratios in the storage or transit container. It may be necessary, for example in the case of isocyanate-functional components or silane-functional components, to seal the container against moisture after it has been filled. The container may be selected from a broad range of containers including, for example, the conventional 200 liter drums, large-volume pouring containers or large-volume flexible containers of the so-called "big bag" type. The only condition that suitable storage or transit containers have to satisfy is that they should if necessary be sealable against moisture and should enable the flowable granules to be removed either by gravity or, for example, by pneumatic feed systems.

At the end user, the granules according to the invention may readily be removed from the storage container because they flow freely or are flowable and can then easily be fed to the mixing unit. There are no dosing problems because the reactive particles a) and b) have already been mixed in the correct ratio by the manufacturer. The mixing unit must be of a high-shear type because the granules are shattered in the mixing unit, optionally after heating, and form a homogeneous mass so that the two reactive components a) and b) are mixed together. After this homogenization, the thermoplastic melt is applied, optionally through a shaping nozzle, to at least one edge of a flat material, for example a panel of glass. The second flat material is then positioned exactly onto the surface of the extruded reactive thermoplastic material. The two flat materials are then optionally pressed and left to cool, the edge bond immediately having sufficient early strength for further processing.

The mixture may be heated either by external heating units or by the energy of the high-shear mixing process.

Actual examples of suitable high-shear mixing units are single-screw and multiple-screw extruders, kneaders with a discharge screw optionally preceded by a static mixer, (co)kneaders, multiple-chamber mixers or mixing units of the type used for the production of bulk molding compounds or special dough molding compounds and co-called Konterna mixing units (manufacturer Ika).

In principle, however, the particle mixtures according to the invention may also be applied from small applicators, for example from conventional cartridges. To this end, the cartridges optionally have to be heated and the piston moved by compressed air, hydraulically or mechanically in order to force the molten granules out of the cartridge opening. The cartridge may be preceded by a static mixer known per se as the high-shear mixer. Static/dynamic mixing systems as disclosed, for example, in WO 95/24556 may also be used. Static/dynamic mixing systems as disclosed in EP-A-313519, EP-A-351358 and in DE-U-8717424 are also suitable.

The reactive blends of thermoplastic polymer particles according to the invention are preferably used for the production of insulating glass, They may also be used for the production of solar collectors or solar elements and for the production of facade elements of glass or sheet-like materials similar to glass which have to be flexibly/elastically joined at their edges. The compositions according to the invention may also be used for the production of sheet-form casting resins and for the edge sealing of safety glass.

The following Examples are intended to illustrate the invention without limiting it in any way. Unless otherwise indicated, all quantities in the following Examples are percentages or parts by weight, based on the composition as a whole.

EXAMPLES

In the following Examples, the formulation ingredients were mixed in vacuo to homogeneity in the absence of air in a laboratory kneader.

In order to test stability in storage, some of the resulting mixture was introduced into moisture-proof cans which were then closed. The material retained its reactivity and crosslinkability after storage for several weeks in the closed container.

In order to test the curing properties, another part of the mixture was pressed to 50 mm diameter and 10 mm thick disks and the progress of curing was measured by penetration measurement by the cone penetration method to ASTM D 217. The cone angle was 30°, the weight 150 grams and the penetration time 6 seconds. Penetration was measured on the one hand immediately and on the other hand after storage for several days in a standard conditioning atmosphere (DIN 50014). The first measurement was intended to determine the progress of curing in ambient conditions, the second was intended to determine accelerated curing.

In order to determine tensile strength, another part of the material was pressed to 13-14 mm thick plates and cut into 1 cm wide and 5 cm long strips. The strips were placed centrally on a 5 cm×5 cm plate of glass, after which a second glass plate was positioned on the adhesive/sealant strips so that the two glass plates were congruent. With the assistance of spacers, the two glass plates were pressed to a distance of 12.5 mm so that the adhesive/sealant strip completely wetted both glass plates and had dimensions of 12.5×10×50 mm. Tensile strength was then determined in an Instron laboratory tensile tester after the test specimens had been stored for 1 day at 80° C. and for several days at 80° C.

TABLE

|  | Example |  |  |  |  |  |
|---|---|---|---|---|---|---|
|  | 1 | 2 | 3 | 4 | 5 | 6 |
| Polyisobutylene[1] | 145 | 145 | 145 | 145 | 145 | 167 |
| Polyethylene wax[2] | 5 | 5 | 5 | 5 | 5 | 5.8 |
| Chalk[3] | 90 | 90 | 90 | 90 | 90 | 103.7 |
| Carbon black[4] | 100 | 100 | 100 | 100 | 100 | 115.2 |
| Polybutene/isobutene[5] | 10 | 10 | 10 | 10 | 10 | 11.5 |
| Molecular sieve 3A (powder) | 65 | 65 | 65 | 65 | 65 | 74.9 |
| SEBS polymer[6] |  | 100 |  | 100 | 100 |  |
| EB polymer[7] |  |  |  |  | 20 |  |
| Maleinized polybutadiene[8] | 137.4 |  | 68.7 |  |  |  |
| OH-functional polybutadiene[9] | 56 |  | 28 |  |  |  |
| NCO-functional polybutadiene[10] |  |  |  | 100 | 100 | 115.2 |
| Silane-functional polyisobuylene[11] |  | 100 |  |  |  |  |
| Polyether plasticizer |  |  | 6 |  |  |  |
| Glymo[12] |  | 5 |  | 5 | 5 | 5.76 |
| Potassium octoate |  |  | 2 |  |  |  |
| DBTL[13] |  |  |  | 1 | 1 | 1.15 |
| Dibutyl tin acetyl acetonate |  | 1.5 |  |  |  |  |
| Penetration[14] (immediate) | 93 | 34 | 12 | 19 | 26 |  |
| Penetration (x days NK)[15] | 34d-10 | 63d-20 | 14d-5 | 15d-12 | 12d-17 |  |
| Penetration (x days 80° C.) | 34d-1 | 63d-8 | 14d-2 | 15d-5 | 12d-6 |  |
| Shore A (final value after curing) | 80 |  | 77 |  |  |  |
| Tensile strength (1 day 80° C.) [Mpa] |  | 0.5 |  | 0.5 | 0.7 | 1.2 |
| Tensile strength (x days 80° C.) [Mpa] |  | 50d/0.8 |  | 15d/1.5 | 14d/1.5 | 14d/1.4 |

Legend to the Table:
[1] Polyisobutylene, mol. weight Ca. 85,000, penetration 80 (DIN 1995/43), Tg −64° C.
[2] Ethylene homopolymer, dropping point 106° C. (ASTM D 3954), Brookfield viscosity 350 mPa.s (140° C.)
[3] Precipitated, mean particle diameter 0.07 μm, BET surface 31.6 m²/g, oil number 55
[4] Printex U, Degussa-Hüls
[5] MW ca. 5,900, viscosity 40,500 cSt/100 (ASTM D 445)
[6] 13% styrene, 30% diblock, ca. 1% anhydride function
[7] Ethylene/butylene copolymer with a terminal OH group (monofunctional)
[8] Maleic anhydride adduct with 1,4-cis-polybutadiene, molecular weight ca. 2,100, acid value ca. 88 mg KOH/g
[9] OH value 46.6, mol. Weight ca. 2,800, 60% trans-1,4-double bonds, 20% cis-1,4-, 20% vinyl-1,2-double bonds
[10] Reaction product of TDI and an OH functional polybutadiene, mol. Weight ca. 3,500, 3.1% NCO content
[11] In accordance with the teaching of EP 758029 or JP 10204222.
[12] Glycidyloxypropyl triethoxysilane
[13] Dibutyl tin dilaurate
[14] To ASTM D 217
[15] NK = standard conditioning atmosphere The molecular sieve used had a water content of ca, 3%.

Example 7

Blend particles for component a) and component b) were separately produced in a kneader in accordance with Examples 1 to 6.

| Component a) | |
|---|---|
| Polyisobutylene[1] | 145 parts |
| OH-functional polybutadiene[2] | 100 parts |
| Chalk[3] | 90 parts |
| Carbon black (Printex, U)[4] | 100 parts |
| Molecular sieve 3A (powder) | 65 parts |
| DBTL[5] | 2 parts |

| Component b) | |
|---|---|
| Polyisobutylene[1] | 145 parts |
| NCO-terminated polybutadiene[2] | 100 parts |
| Chalk[3] | 90 parts |
| Carbon black (Printex, U)[4] | 100 parts |
| Molecular sieve 3A (powder) | 65 parts |

Example 8

| Component a) | |
|---|---|
| Polyisobutylene[1] | 145 parts |
| OH-functional polybutadiene[2] | 56 parts |
| Chalk[3] | 90 parts |
| Carbon black (Printex, U)[4] | 100 parts |
| Molecular sieve 3A (powder) | 65 parts |

-continued

| Component b) | |
|---|---|
| Polyisobutylene[1] | 145 parts |
| Maleinized polybutadiene[2] | 137 parts |
| Chalk[3] | 90 parts |
| Carbon black (Printex, U)[4] | 100 parts |
| Molecular sieve 3A (powder) | 65 parts |

[1] Polyisobutylene, mol. Weight ca. 85,000, penetration 80 (DIN 1995/43), Tg −64° C.
[2] OH value 46.6, mol. Weight ca. 2,800, 60% trans-1,4-double bonds, 20% cis-1,4-, 20% vinyl-1,2-double bonds
[3] Precipitated, mean particle diameter 0.07 μm, BET surface 31.6 m$^2$/g, oil number 55
[4] Degussa-Hüls
[5] Dibutyl tin dilaurate
[6] Reaction product of TDI and an OH functional polybutadiene, mol. weight ca. 3,500, 3.1% NCO content
[7] Maleic anhydride adduct with 1,4-cis-polybutadiene, molecular weight ca. 2,100, acid value ca. 88 mg KOH/g Granules were produced from components a) and b) produced in Examples 7 and 8 by extruding 8 mm diameter strands of material and cutting the strands into 8 mm long pieces. The granules were packed immediately afterwards in moisture-proof cans. The granules still had their original reactivity after storage for several weeks.

For further processing, equal parts of components a) and b) are homogenized and extruded into the corresponding mold. After the material has cured completely, its physical and mechanical data can be determined. The strength values obtained are largely consistent with those obtained in Examples 1 to 6.

We claim:

1. A blend of reactive thermoplastic polymer particles which comprises:
   a) a first portion of the particle blend comprises thermoplastic polymers with reactive groups selected from the group consisting hydroxyl groups, amino groups, carboxyl groups, carboxylic anhydride groups, mercapto groups, silane groups, hydrosilyl groups and mixtures thereof, said thermoplastic polymer comprising a block copolymer selected from the group consisting of styrene-butadiene, styrene-butadiene-styrene, styrene-isoprene, styrene-isoprene-styrene, styrene-ethylene-butylene-styrene and styrene-ethylene-propylene-styrene, and mixtures thereof;
   b) a second portion of the particle blend comprises (i) thermoplastic polymers with reactive groups selected from the group consisting of isocyanate groups, epoxide groups and reactive olefinically unsaturated double bonds, (ii) thermoplastic polymers containing water-binding fillers or (iii) mixtures thereof; and
   c) optionally the blend particles contain auxiliaries and additives which do not react with the functional polymers of the a) and b) particles as a part of the particle a), b) or both or as separate particles;
   wherein said blend is in the form of granules, said granules having a mean particle size from 0.5 millimeter (mm) to 40 millimeter (mm).

2. A blend of reactive thermoplastic polymer particles, said blend comprising:
   a) first granules comprising a first thermoplastic polymer comprising at least one reactive group selected from the group consisting of hydroxyl groups, amino groups, carboxyl groups, carboxylic anhydride groups, mercapto groups, silane groups, hydrosilyl groups, and combinations thereof, said thermoplastic polymer comprising a block copolymer selected from the group consisting of styrene-butadiene, styrene-butadiene-styrene, styrene-isoprene, styrene-isoprene-styrene, styrene-ethylene-butylene-styrene and styrene-ethylene-propylene-styrene, and mixtures thereof; and
   b) second granules comprising
      (i) a second thermoplastic polymer comprising at least one reactive group selected from the group consisting of isocyanate groups, epoxide groups, and reactive olefinically unsaturated double bonds, and combinations thereof,
      (ii) a third thermoplastic polymer containing water-binding fillers, or
      (iii) a mixture thereof
   said blend being in the form of a granulation, said first granules and said second granules having a mean particle size from 0.5 millimeter (mm) to 40 millimeter (mm).

3. A blend of reactive thermoplastic polymer particles which comprises:
   a) first particles comprising thermoplastic polymers selected from the group consisting of poly-α-olefins, elastomeric block copolymers, polyisobutylenes and combinations thereof, said thermoplastic polymers having reactive groups selected from the group consisting of hydroxyl groups, amino groups, carboxyl groups, carboxylic anhydride groups, mercapto groups, silane groups, hydrosilyl groups and mixtures thereof;
   b) second particles comprising (i) thermoplastic polymers selected from the group consisting of poly-α-olefins, elastomeric block copolymers, polyisobutylenes and combinations thereof, said thermoplastic polymers having reactive groups selected from the group consisting of isocyanate groups, epoxide groups, and combinations thereof, (ii) thermoplastic polymers selected from the group consisting of poly-α-olefins, elastomeric block copolymers, polyisobutylenes and combinations thereof; said thermoplastic polymers containing water-binding fillers or (iii) mixtures thereof; and
   optionally auxiliaries and additives that do not react with the functional polymers of the first particles and the second particles, said auxiliaries and additives being present in the first particles, the second particles, as separate particles or a combination thereof,
   said blend being in the form of granules, said granules having a mean particle size from 0.5 millimeter to 40 millimeter.

4. The blend of reactive thermoplastic polymer particles as claimed in claim 3 wherein the particles of parts a), b) and optionally c) of the blend are granules with a mean particle size of from 2 mm to 20 mm.

5. The blend of reactive thermoplastic polymer particles of claim 3 wherein the auxiliaries and additives comprise at least one member selected from the group consisting of catalysts, drying agents, flow aids, dyes and pigments.

6. The blend of reactive thermoplastic polymer particles of claim 3 wherein the particles of parts a), b) and optionally c) of the blend comprise granules with a mean particle size of from 1 to 30 mm.

7. The blend of reactive thermoplastic polymer particles as claimed claim 3 wherein the surface of the granules is treated with at least one member selected from the group consisting of tack-reducing agents and moisture-binding agents.

8. The blend of reactive thermoplastic polymer particles as claimed in claim 7 wherein the at least one tack-reducing agent is selected from the group consisting of carbon black, highly disperse silica, polyethylene powder, talcum, waxes and paraffins.

9. A blend of reactive thermoplastic polymer particles which comprises:
   a) first particles comprising thermoplastic polymers selected from the group consisting of, elastomeric block copolymers, polyisobutylenes and combinations thereof, said thermoplastic polymers having reactive groups selected from the group consisting of hydroxyl groups, amino groups, carboxyl groups, carboxylic anhydride groups, mercapto groups, silane groups, hydrosilyl groups and mixtures thereof; and
   b) second particles comprising (i) thermoplastic polymers selected from the group consisting of poly-α-olefins, elastomeric block copolymers, polyisobutylenes and combinations thereof, said thermoplastic polymers having reactive groups selected from the group consisting of isocyanate groups, epoxy groups, and reactive olefinically unsaturated double bonds, (ii) thermoplastic polymers selected from the group consisting of poly-α-olefins, elastomeric block copolymers, polyisobutylenes and combinations thereof, said thermoplastic polymers containing water-binding fillers or (iii) mixtures thereof.

10. The blend of reactive thermoplastic polymer particles as claimed in claim 9 wherein the reactive groups of parts a) and b) of the blend are present in substantially stoichiometric quantities.

11. The blend of reactive thermoplastic polymer particles as claimed in claim 9 wherein the surface of the granules is treated with at least one member selected from the group consisting of tack-reducing agents and moisture-binding agents.

12. The blend of reactive thermoplastic polymer particles as claimed in claim 11 wherein the at least one tack-reducing agent is selected from the group consisting of carbon black, highly disperse silica, polyethylene powder, talcum, waxes and paraffins.

13. The blend of reactive thermoplastic polymer particles as claimed in claim 9 wherein the particles of parts a) and b) of the blend are granules with a mean particle size of from 0.5 mm to 40 mm.

14. The blend of reactive thermoplastic polymer particles of claim 9 wherein the particles of parts a) and b) of the blend comprise granules with a mean particle size of from 2 mm to 20 mm.

15. The blend of reactive thermoplastic polymer particles of claim 9 wherein the granules comprise a non-tacky surface layer.

16. The blend of reactive thermoplastic polymer particles of claim 15 wherein the non-tacky surface layer comprises a continuous layer that covers more than 90% of the surface of the granules.

17. The blend of reactive thermoplastic particles of claim 9, further comprising auxiliaries and additives that do not react with the functional polymers of the first particles and the second particles, said auxiliaries and additives being present in the first particles, the second particles, as separate particles or a combination thereof.

18. The blend of reactive thermoplastic polymer particles claimed in claim 17 wherein the auxiliaries and additives are comprised of at least one member selected from the group consisting of catalysts, drying agents, flow aids, antiagers, dyes and pigments.

19. A blend of reactive thermoplastic polymer particles which comprises:
   a) first particles comprising thermoplastic polymers selected from the group consisting of poly-α-olefins, elastomeric block copolymers, polyisobutylenes and combinations thereof, said thermoplastic polymers having reactive groups selected from the group consisting of hydroxyl groups, amino groups, carboxyl groups, carboxylic anhydride groups, mercapto groups, and mixtures thereof; and
   b) second particles comprising (i) thermoplastic polymers selected from the group consisting of poly-α-olefins, elastomeric block copolymers, polyisobutylenes and combinations thereof, said thermoplastic polymers having reactive groups selected from the group consisting of isocyanate groups, epoxide groups, and reactive olefinically unsaturated double bonds, (ii) thermoplastic polymers selected from the group consisting of poly-α-olefins, elastomeric block copolymers, polyisobutylenes and combinations thereof, said thermoplastic polymers containing water-binding fillers or (iii) mixtures thereof.

* * * * *